US008834039B1

(12) United States Patent
Hoener et al.

(10) Patent No.: US 8,834,039 B1
(45) Date of Patent: Sep. 16, 2014

(54) OPTICAL CONNECTOR AND OPTICAL CONNECTOR ASSEMBLY

(75) Inventors: Kylan Hoener, Portland, OR (US); Aaron Brown, Vancouver, WA (US); Walter R. Sanders, Vancouver, WA (US); Richard Knight, Vancouver, WA (US)

(73) Assignee: nLIGHT Photonics Corporation, Vancouver, WA (US)

( * ) Notice: Subject to any disclaimer, the term of this patent is extended or adjusted under 35 U.S.C. 154(b) by 93 days.

(21) Appl. No.: 13/293,500

(22) Filed: Nov. 10, 2011

(51) Int. Cl.
  *G02B 6/36* (2006.01)
(52) U.S. Cl.
  USPC .............................................. 385/80; 385/83
(58) Field of Classification Search
  USPC .............................. 385/60–69, 72, 78, 80, 83
  See application file for complete search history.

(56) References Cited

U.S. PATENT DOCUMENTS

| | | | |
|---|---|---|---|
| 4,440,469 A | 4/1984 | Schumacher | |
| 4,722,584 A | 2/1988 | Kakii et al. | |
| 5,778,125 A | 7/1998 | Busse et al. | |
| 5,923,802 A | 7/1999 | Giebel et al. | |
| 6,062,739 A | 5/2000 | Blake et al. | |
| 6,409,394 B1 * | 6/2002 | Ueda et al. | 385/80 |
| 7,195,400 B2 | 3/2007 | Asano et al. | |
| 7,252,854 B2 | 8/2007 | Liberkowski | |
| 7,374,346 B2 | 5/2008 | Tanaka et al. | |

* cited by examiner

*Primary Examiner* — Uyen Chau N Le
*Assistant Examiner* — Michael Mooney
(74) *Attorney, Agent, or Firm* — Ethan A. McGrath

(57) ABSTRACT

An adhesive void mitigating fiber ferrule optical connector includes a housing for an optical fiber, the housing including opposite front and rear openings and an elongate bore providing an interior surface and extending between the opposite front and rear openings for insertably receiving the optical fiber from the rear opening through the front opening, the housing also including a front adhesive fill-port in communication with the elongate bore nearer the front opening for providing adhesive substantially void-free in the elongate bore and for surroundably securing the optical fiber extending therein to the interior surface.

10 Claims, 2 Drawing Sheets

OPTICAL CONNECTOR AND OPTICAL CONNECTOR ASSEMBLY

BACKGROUND OF THE INVENTION

1. Field of the Invention

Generally, the field of the present invention is optical connectors. More particularly, the present invention relates to an optical connector and optical connector assembly employing a front fill-port for substantially void-free adhesive insertion.

2. Background

Optical connectors and optical connector assemblies are used to connect devices transmitting one or more optical signals or outputs through a medium such as a waveguide. Often optical fiber waveguides are the transmission medium of choice because of their ease of manufacture and wide applicability across industry. The size and flexibility of optical fibers have made them suitable for use in legacy type connectors such as subminiature version-A ("SMA") type connectors. However, for connectors supporting high performance requirement optical transmission media and systems, additional design features must be incorporated to allow reasonable reliability and robustness against failure.

In U.S. Pat. No. 5,778,125, an optical fiber termination connector is disclosed that includes an elongated structure with a chamber extending therethrough open at both ends, a fiber disposed in the chamber and spaced therefrom, a solid first material disposed in the chamber around the fiber, and an air gap in the chamber around the end of the fiber. An air port is disposed in the lower section of the cylinder to exhaust trapped air in the chamber, and so voids are purposefully created in the chamber. Thus, despite efforts to achieve an optical connector that is reliable and robust against failure, there remains a need for connectors that can overcome the drawbacks of prior art devices.

SUMMARY OF THE INVENTION

The present invention is directed to an innovation that addresses the problems of prior art optical connectors and optical connector assemblies by providing a robust and reliable optical connector and optical connector assembly with a front fill-port that mitigates adhesive voids linked to optical connector and optical connector assembly failure.

Thus, in one aspect of the present invention, an optical connector includes an adhesive void mitigating fiber ferrule which includes a housing for an optical fiber, the housing including opposite front and rear openings and an elongate bore providing an interior surface and extending between said opposite front and rear openings for insertably receiving the optical fiber from the rear opening through the front opening, the housing also including a front adhesive fill-port in communication with the elongate bore nearer the front opening than the rear opening for providing adhesive substantially void-free in the elongate bore and for surroundably securing the optical fiber extending therein to the interior surface.

According to another aspect of the present invention, an optical connector assembly includes a fiber ferrule including a housing having opposite front and rear openings and an elongate bore providing an interior cavity and interior surface, the elongate bore extending between the opposite front and rear openings, the housing also having a front adhesive fill-port in communication with the elongate bore nearer the front opening than the rear opening, an optical fiber inserted through the rear opening, extending through the interior cavity to the front opening, the optical fiber having a cylindrical interior and a buffer layer surrounding the cylindrical interior, and adhesive inserted through the adhesive fill-port and surroundably securing the optical fiber to the interior surface of the elongate bore in a void-free manner.

The foregoing and other objects, features, and advantages will become more apparent from the following detailed description, which proceeds with reference to the accompanying figures.

DETAILED DESCRIPTION OF THE INVENTION

Figure 1:
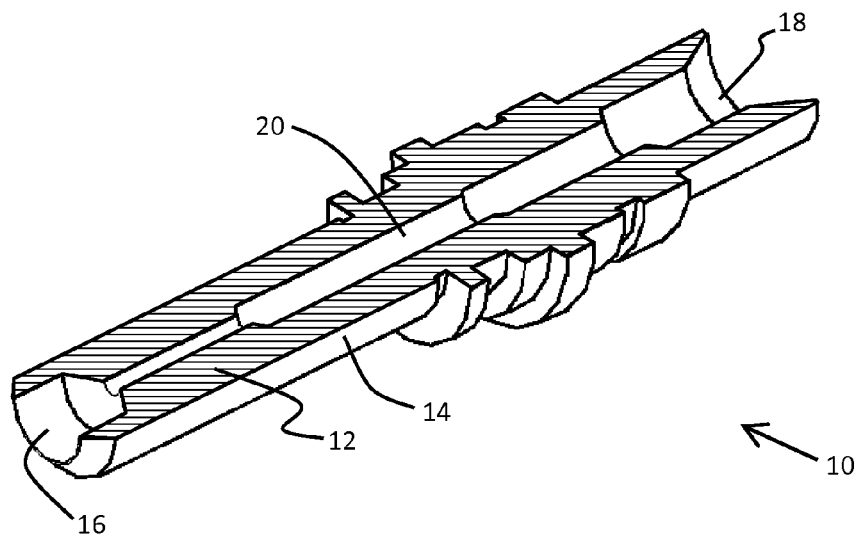
FIG. 1 is a perspective view of a cross-section of an optical connector of the prior art.

Referring now to FIG. 1, an optical connector 10, or fiber ferrule, is shown in cross-section along an axially centered longitudinal plane 12 thereof. The optical connector 10 includes a housing 14 and front and rear openings 16, 18. An elongated bore 20 extends through the housing 12 between the front and rear openings 16, 18. An optical fiber (not shown) is inserted through the rear opening 18 and extends through the elongated bore 20 through to the front opening 16. The front opening 16 of the optical connector 10 is typically used to interface with or be received by another device.

Figure 2:
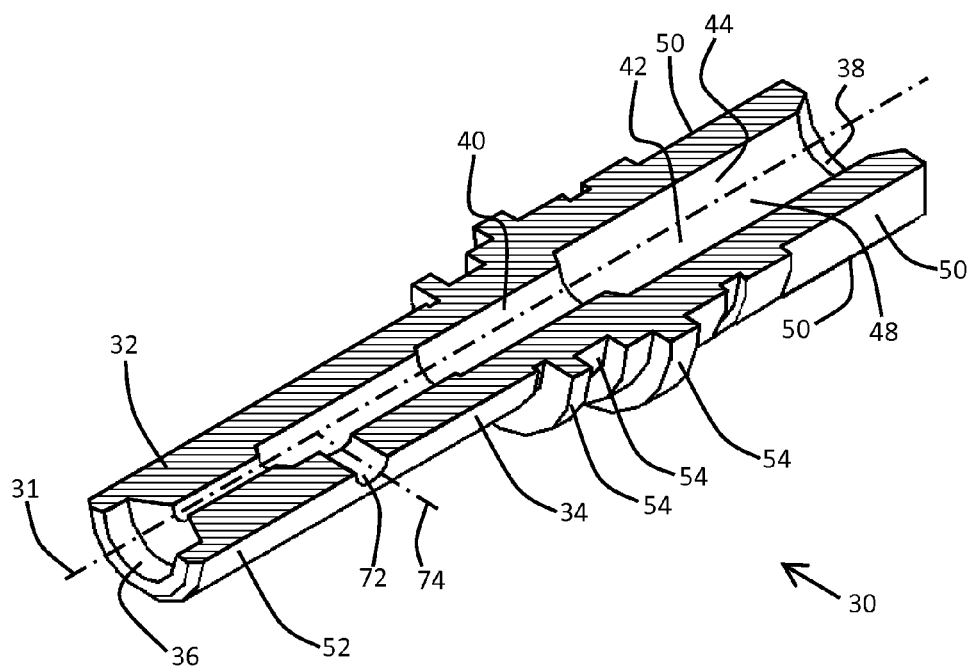
FIG. 2 is a perspective view cross-section of an optical connector according to an aspect of the present invention.
Figure 3:
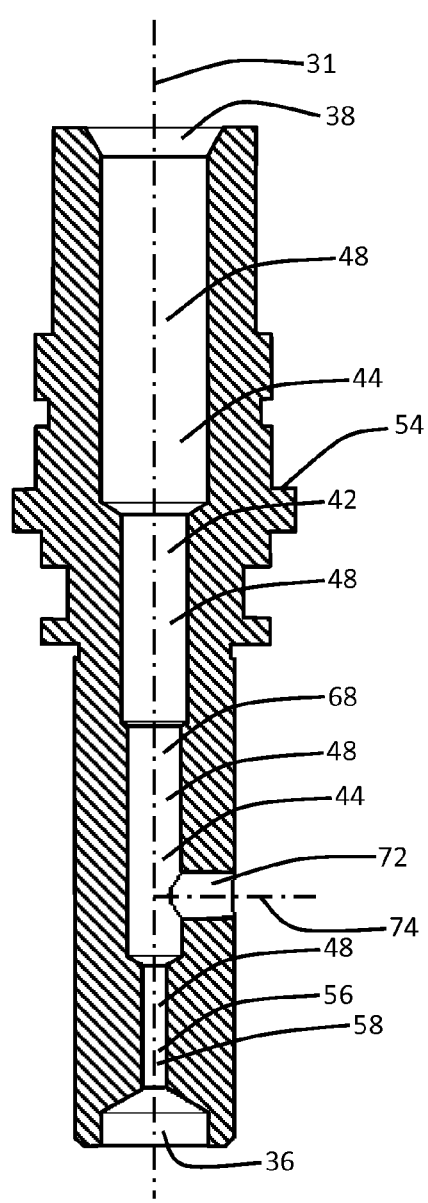
FIG. 3 is a plan view of a cross-section of an optical connector according to an aspect of the present invention.

Referring now to FIGS. 2 and 3, an optical connector 30, or fiber ferrule, is shown in cross-section according to an exemplary embodiment of the present invention. For illustrative purposes, the optical connector 30 is cut along longitudinal plane 32 aligned with center longitudinal axis 31 to reveal the interior structure of a housing 34. Optical connector 30 includes opposite front and rear openings 36, 38 and an elongated bore 40 communicating therebetween and defining an interior cavity 42 having an interior surface 44. The cavity 42 is configured to insertably receive an optical fiber 46 (shown in FIG. 4). The elongated bore 40 is a multi-stage bore that includes a plurality of bore portions 48 successively decreasing in cross-sectional area from the rear opening 38 to the front opening 36. Gripping surfaces 50 are disposed on an exterior surface 52 of the housing 34 near rear opening 38 and provide a location for gripping or adjustment of connector 30 in relation to other devices or components. As shown, four surfaces 50 are spaced apart from and perpendicularly surround center axis 31. Annular locking recesses and protrusions 54 are also included in the exterior surface 52 of the connector housing 34 and provide a structure for operatively engaging and securing the connector 30 to other devices or components.

Figure 4:
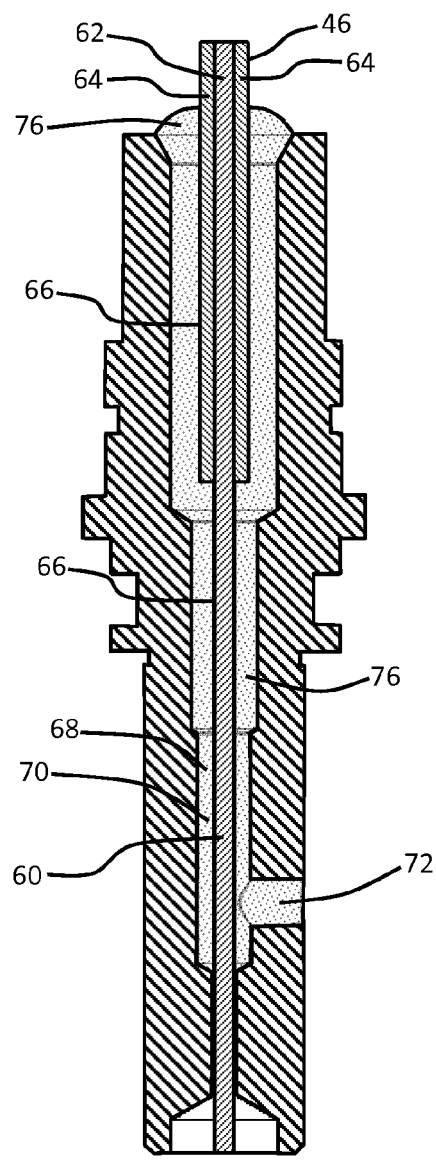
FIG. 4 is a plan view of a cross-section of an optical connector according to an aspect of the present invention

A last bore portion 56 of the plurality of bore portions 48 has a cross-sectional area suitable for a snug fit between the hollow cavity 58 formed thereby and a fiber tip portion 60 of the optical fiber 46 inserted therethrough, as shown in cross-section in FIG. 4. The inserted optical fiber 46 comes from optical fiber stock that generally has an interior region 62 that includes a core and cladding and an outer region 64 that includes a buffer or jacketing material. The fiber tip portion 60 has the buffer 64 removed for insertion through the snug-fit bore portion 56 and exposes an exterior surface 66 of interior region 62 of the fiber 46. Adjacent to the snug-fit bore portion 56, a second to last bore portion 68 extends towards the rear opening 38 a predetermined distance and has a larger cross-sectional area that does not provide a snug-fit for fiber tip portion 60 of optical fiber 46 inserted therethrough. Instead, an annularly gapped region 70 is created between the interior surface 44 of the annularly gapped bore portion 68 and the exposed surface 66 of the optical fiber 46. Bore portions 48 adjacent to the annularly gapped bore portion 68 and extending towards rear opening 38 include similar tubular regions around optical fiber 46 when disposed in the housing 34.

Disposed nearer front opening 36 is a fill-port 72 providing communication between the interior cavity 42 and the outside the housing 34. The fill-port passage 72 is bored along a fill-port axis 74 that extends generally perpendicularly in relation to the optical connector axis 31 and intersectable therewith. However, in some embodiments the perpendicularity of the fill-port axis 74 is maintained while the axis 74 does not intersect the center axis 31 and is instead spaced therefrom. In other embodiments the relation between the fill-port axis 74 and the center axis may be other than perpendicular. In still other embodiments the shape of the passage 72 may be other than cylindrical, such as conical, complex-cylindrical, etc.

Referring more particularly to FIG. 4, optical fiber 46 is inserted through optical connector 30 so that fiber tip 60 extends through snug-fit cavity 58 and is snugly secured therein. An adhesive or other securing resin vessel (not shown) is positioned in relation to front fill-port 72 and injects securing adhesive 76, such as epoxy, into the interior cavity 42 via the second to last bore portion 68. Thus, the diameter or shape of the front fill-port 72 is suitable for reception of an insertable adhesive injection device, an example of which would be a syringe. Injected adhesive 76 flows around and fills annularly gapped region 70 of the second to last bore portion 68 while being prevented from penetrating the snug fit cavity 58 and proceeds to fill remaining interstitial volume of cavity 42 until emerging from rear opening 38. Because the adhesive 76 is inserted from fill-port 72, the adhesive 76 fills the volume between the fiber 46 and interior surface 44 to surround the exterior surface 66 of fiber 46 in a substantially void-free manner. The hardened resin secures the fiber 46 in place to prevent fiber pistoning and other failure modes caused by tension, compression, and thermal cycling.

It is thought that the present invention and many of the attendant advantages thereof will be understood from the foregoing description and it will be apparent that various changes may be made in the parts thereof without departing from the spirit and scope of the invention or sacrificing all of its material advantages, the forms hereinbefore described being merely exemplary embodiments thereof.

What is claimed is:

1. An optical connector comprising:
   an adhesive void mitigating fiber ferrule including a housing for an optical fiber, said housing including opposite front and rear openings and an elongate bore providing an interior surface and extending between said opposite front and rear openings for insertably receiving the optical fiber from said rear opening through said front opening, said housing also including a front adhesive fill port located entirely in the front half of the ferrule in communication with said elongate bore nearer said front opening than said rear opening for providing adhesive substantially void-free in said elongate bore and for surroundably securing the optical fiber extending therein to said interior surface.

2. The optical connector of claim 1 wherein said elongate bore includes a plurality of bore portions each having a sequentially decreasing cross-sectional area from said rear opening to said front opening.

3. The optical connector of claim 1 wherein said bore includes a plurality of bore portions extending between said opposite front and rear openings, said plurality of bore portions including a snug-fit bore portion extending inwardly from said front opening and having a diameter closely matched to a glass diameter of the optical fiber insertable therein, said plurality of bore portions also including an annularly gapped bore portion adjacent said snug-fit bore portion and extending inwards therefrom towards said rear opening, said annularly gapped portion having a larger diameter than said snug-fit bore portion and defining an adhesive cavity for surrounding the optical fiber, said front fill-port in fill-communication therewith.

4. The optical connector of claim 1 wherein said fiber ferrule is an SMA-type fiber ferrule.

5. The optical connector of claim 1 further comprising gripping surfaces perpendicularly disposed nearer said rear opening.

6. An optical connector assembly, comprising:
   a fiber ferrule including a housing having opposite front and rear openings and an elongate bore providing an interior cavity and interior surface, said elongate bore extending between said opposite front and rear openings, said housing also having a front adhesive fill port located entirely in the front half of the ferrule in communication with said elongate bore nearer said front opening than said rear opening;
   an optical fiber inserted through said rear opening, extending through said interior cavity to said front opening, said optical fiber having a cylindrical interior and a buffer layer surrounding said cylindrical interior, and;
   adhesive inserted through said adhesive fill-port and surroundably securing said optical fiber to said interior surface of said elongate bore of said housing in a void-free manner.

7. The optical connector assembly of claim 6, wherein said elongate bore includes a plurality of bore portions extending therealong with each defining a separate respective interior cavity portion and interior cavity surface, said plurality of bore portions including a snug-fit bore portion extending inwardly from said front opening and having a diameter closely matched to a glass diameter of the optical fiber insertable therein with the insertion of said optical fiber therein preventing substantial intrusion of inserted adhesive therein, said plurality of bore portions also including an annularly gapped bore portion adjacent said snug-fit bore portion and extending inwards therefrom towards said rear opening, said annularly gapped bore portion having a larger diameter than said snug-fit bore portion and defining an adhesive cavity between said optical fiber and said annularly gapped bore portion interior cavity surface, said front fill-port being in fill-communication with said adhesive cavity.

8. The optical connector assembly of claim 7 wherein said adhesive substantially fills the space between said interior surface of said elongate bore and said optical fiber outside of said snug-fit bore portion.

9. The optical connector assembly of claim 6 wherein said fiber ferrule is an SMA-type fiber ferrule.

10. The optical connector of claim 6 further comprising gripping surfaces perpendicularly disposed nearer said rear opening.

* * * * *